United States Patent [19]
Rubinstein

[11] Patent Number: 5,406,716
[45] Date of Patent: Apr. 18, 1995

[54] GIFT CARD SYSTEM

[76] Inventor: Scott Rubinstein, 6 Highwoods Rd., Saugerties, N.Y. 12477

[21] Appl. No.: 96,487

[22] Filed: Jul. 22, 1993

[51] Int. Cl.$^6$ ............................ G01B 3/10; B65D 37/00
[52] U.S. Cl. ........................................ 33/760; 33/1 B; 33/2 R; 33/512; 229/72
[58] Field of Search ................. 33/760, 751, 755, 758, 33/759, 761, 768, 770, 1 B, 2 R, 3 R, 3 A, 769, 511, 512, 514.1, 668, 562, 563; 229/1.5 R, 72

[56] References Cited

U.S. PATENT DOCUMENTS

| 1,212,279 | 1/1917 | Stone | 33/1 B |
| 1,612,637 | 12/1926 | Mesterton | 33/7.55 |
| 1,774,215 | 8/1930 | Weinthrop | 229/72 |
| 2,163,661 | 6/1939 | Brown | 33/3 A |
| 2,792,110 | 5/1957 | Wanish | 33/758 |
| 3,144,717 | 8/1964 | Gumaelius | 33/759 |
| 4,665,620 | 5/1987 | Osteen | 33/760 |
| 4,786,010 | 11/1988 | Dynan | 33/760 |
| 4,880,232 | 11/1989 | Lang | 33/760 |
| 4,890,728 | 1/1990 | Grimsley | 229/72 |
| 5,170,889 | 12/1992 | Cue | 229/1.5 R |

FOREIGN PATENT DOCUMENTS

| 0004372 | 4/1891 | United Kingdom | 33/514.1 |
| 2172576 | 9/1986 | United Kingdom | 33/769 |

Primary Examiner—Christopher W. Fulton
Attorney, Agent, or Firm—Schmeiser, Olsen & Watts

[57] ABSTRACT

The invention is a card-shaped, foldable kit that includes apparatus that enables a person to determine and record another person's body dimensions and apparel sizes. The information is recorded on a data card that can be referred to at a later date by the user to facilitate the purchase of a gift of the correct size.

10 Claims, 2 Drawing Sheets

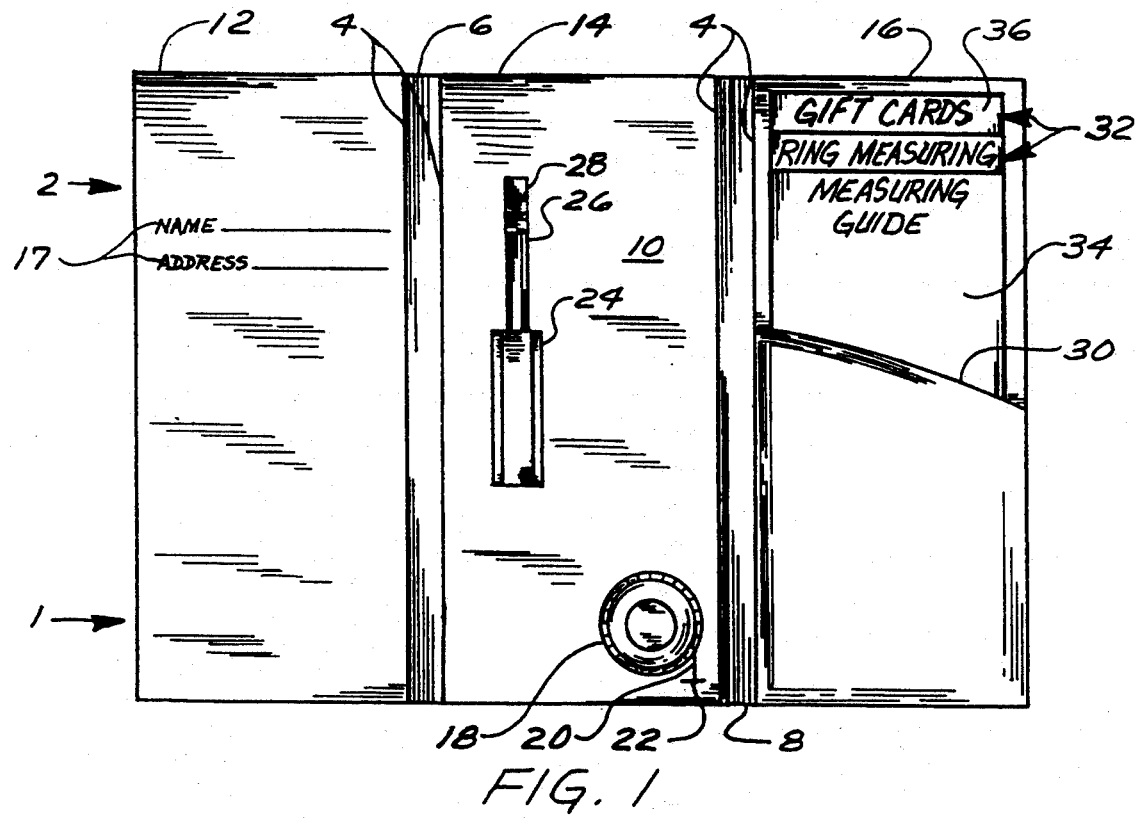
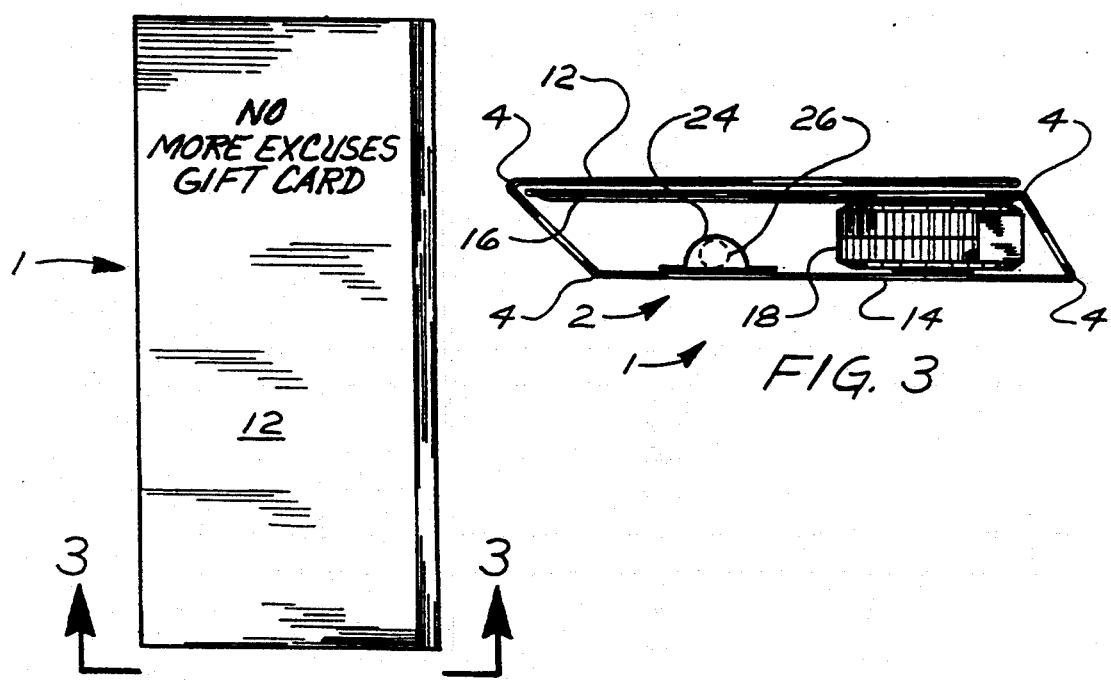

GIFT CARD SYSTEM

FIELD OF THE INVENTION

The invention is in the field of apparatus used for information determination and recording. More particularly, the invention is a card-shaped kit that enables a person to record vital information about another person in order to facilitate the proper selection of gifts.

BACKGROUND OF THE INVENTION

Many people have experienced the problem of wanting to give another person a gift but not knowing certain vital information that would facilitate the selection of the gift. If one wishes to give some form of apparel or other item that the person will wear, the giver is usually faced with the problem of determining the person's "size."

The determination of a person's size is based on the dimensions of his or her body. This information is usually not precisely known to the giver of a gift, and for this reason, many people avoid giving gifts of wearing apparel. For those who do give gifts such as clothing or rings, the gift will sometimes be of the wrong size and cause the receiver of the gift to spend time returning or exchanging the item.

Therefore, a person trying to decide on a gift for someone else will often wish he or she had precise information about the size requirements or body dimensions of the future receiver of the gift. For a person who buys presents for a large number of people, an organized system for determining and recording size information would be desirable.

SUMMARY OF THE INVENTION

The invention is a system in kit form that enables a user to determine another person's measurements and to record the information in an organized and readily accessible fashion. The system includes a card-like folder into which is secured multiple measuring tools, pre-printed instructions and information on determining a person's size, and a number of data recording cards.

The system's measuring tools include a tape measure and a finger measurement tool. The tape measure is preferably of the retractable type and capable of measuring lengths up to approximately forty-eight inches. The finger measurement tool is in the form of a card that includes a plurality of apertures of different diameters with each aperture labeled with the associated ring size.

The instruction/information materials included with the kit describe correct measurement methods for determining various of a person's clothing sizes. These materials are preferably in card or pamphlet form and are stored in a pocket of the folder.

The data recording cards are also preferably stored in a pocket of the folder. Each of these cards includes an organized listing of common measurements that might be required and also a listing of types of apparel that have associated size categories. Adjacent each listing is a blank space into which a user may record a person's particular measurements or sizes. In this manner, a user can fill out a data card with identifying information such as the person's name and address and then write in all of that person's vital measurements and size data. To facilitate the recording of the information, a writing utensil such as a non-smearing pen or pencil is also removably stored in a pocket of the folder.

BRIEF DESCRIPTION OF THE DRAWINGS

FIG. 1 is a front view of an information determination and recording kit in accordance with the invention, with the folder in an open condition.

FIG. 2 is a view of the folder of FIG. 1 shown in a closed condition.

FIG. 3 is an end view of the folder shown in FIG. 2.

DETAILED DESCRIPTION OF THE DRAWINGS

Figures 4, 5:
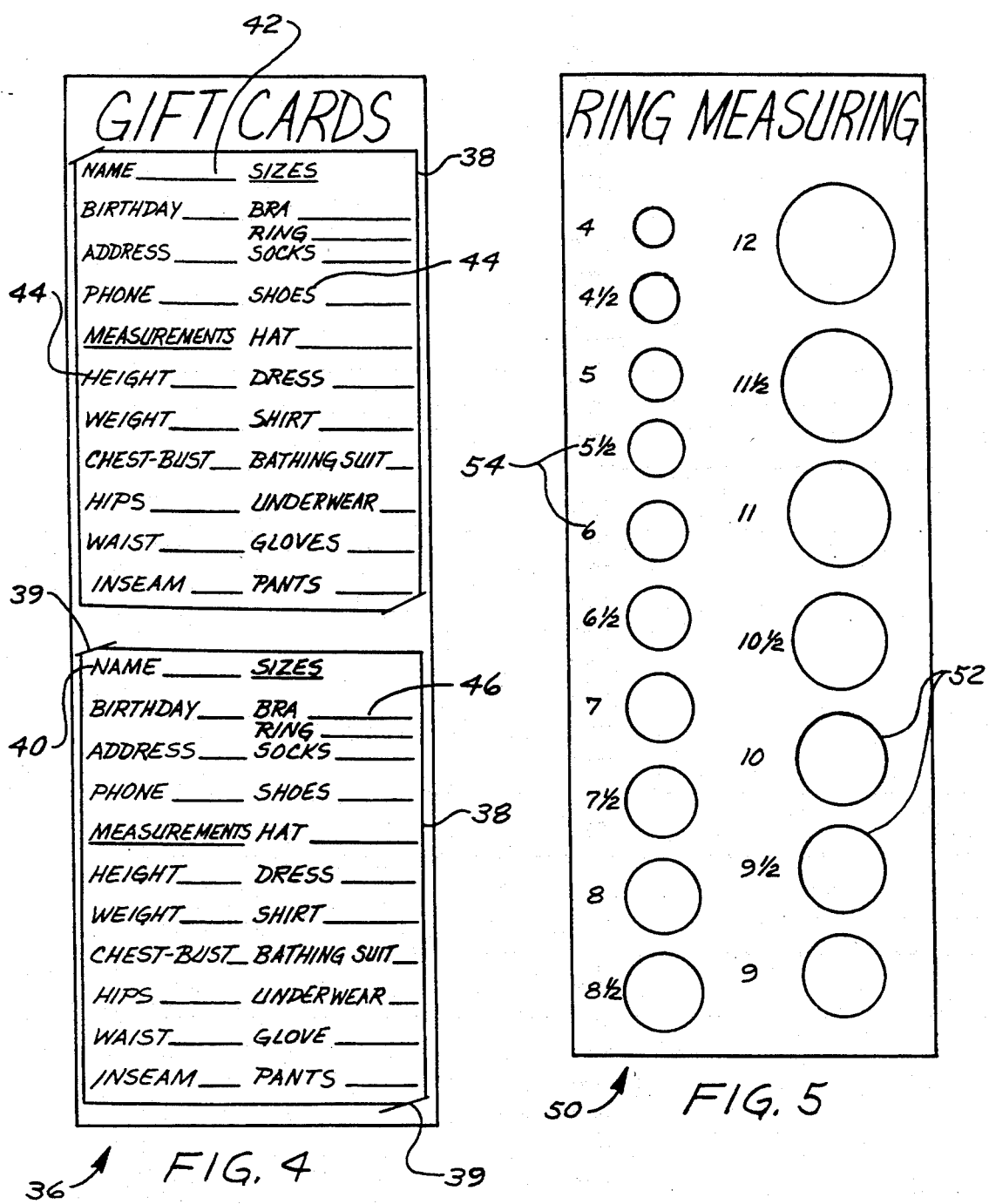
FIG. 4 is a detailed view of two of the data recording cards located in a holder.
FIG. 5 is a detailed front view of a finger measuring tool in card form.

Referring now to the drawings in greater detail, wherein like reference characters refer to like parts throughout the several figures, there is shown by the numeral 1 a kit in accordance with the invention that is designed for the determination and recording of measurement and/or size information.

The kit 1 includes a sheet-like folder or base 2 of a rigid paper material such as cardboard. A number of elongated creases 4 extend from the folder's top edge 6 to its bottom edge 8. The creases function to divide the face 10 of the folder into three portions: a left portion 12, a center portion 14 and a right portion 16.

The left portion 12 of the folder preferably includes written information 17 that identifies the owner of the kit. Other written information may be included that describes the basic purpose of the kit. Alternately, the area may be left blank or decorated.

The center portion 14 of the folder includes a retractable tape measure 18 that is preferably capable of measuring distances of approximately thirty-six to sixty inches. The tape measure includes a measuring strip 20 (partially shown in FIG. 2) that has a 'T'-shaped hook 22 at it's outer end. The hook is used to facilitate anchoring of the strip when taking measurements. The strip may include pre-printed specifications on one side for hat sizes, shoe sizes, etc. and the other side of the tape can include conventional measuring indicia. While a retractable tape measure is shown, other measuring devices such as a folding tape measure or a folded measuring tape may be alternately employed.

The tape measure is preferably permanently secured to the face of the folder with glue. However, other well-known securement forms may be substituted that either permanently or removably secure the tape measure in place. The latter securement may be in the form of, for example, a pocket formed from a fabric or resilient material or an attachment using complementary hook and pile fasteners. In addition, the tape measure may be secured to the card using a flexible string (not shown) that allows the tape measure to be moved a short distance relative to the card. Located adjacent the tape measure is a pocket 24 into which is removably stored a writing utensil 26 such as the pencil shown or a non-smearing pen (not shown). The writing utensil preferably includes an eraser 28.

The right portion 16 of the folder includes at least one pocket 30 that removably stores a plurality of cards 32 and at least one card-like instruction/information sheet 34. The cards are preferably made of a rigid cardboard or plastic material. In the preferred embodiment, each of the cards included in the kit as well as the instruction- /information sheet(s) are of a different length to facilitate their identification and selection.

There are at least two different types of cards 32 with the first type of card 36 being the longest. Card 36 is shown in FIG. 4 and acts as a support for two data recording cards 38. Each card 38 is removably attached to card 36 through the use of slits 39 in card 36 that receive two opposite corners of the associated card 38.

As can be seen in FIG. 4, the cards 38 include at the top identifying indicia 40 such as name, address, phone and birthday. These indicia are adjacent to blank spaces 42 into which a user can write in the name, birthday, etc. of the person associated with the data to be recorded on that particular card 38. The card further includes indicia 44 in the form of an organized listing of common measurements that might be required and also a listing of types of apparel with the associated size categories (in the example shown in FIG. 4, this includes height, weight, chest-bust, hips, waist, inseam, bra, ring, socks, shoes, hat, dress, shirt, bathing suit, underwear, gloves and pants). Adjacent each of the indicia 44 is a blank space 46 into which a user may record a person's particular measurements or sizes. In this manner, a user can fill out the card with a person's name and then write in all of that person's vital measurements and size data. The listed indicia 40 and 44 are preferred, however other identifying, measurement or size data may be added or some of the indicia shown may be deleted.

It should be noted that while only a single card 36 is shown, the kit may include a plurality of such cards. In addition, card 36 may itself have the indicia 40 and 44 on a front surface thereof for the recording of information and thereby not requiring the use of removable ancillary cards 38. Also, one, or a greater number than two cards 38 may be secured to holder 36. It should also be noted that the writing utensil 26 should be of a type that is capable of placing marks onto spaces 42 and 46.

The second type of card 32 is actually a tool for measuring the diameter of a person's finger and is shown in detail in FIG. 5. This card, 50, is used to determine a person's ring size and includes a plurality of circular cut-outs 52 of different diameters with each cut-out labeled with indicia 54 that show the associated ring size. By inserting a finger through the cut-out that is closest in diameter to that of the finger, a person's ring size is determined. Card 50 is preferably made from a rigid cardboard or plastic material.

The card-like instruction sheet(s) 34 provides pre-printed measuring instructions/information detailing how to obtain a person's size through the taking of certain measurements. The instructions/information 34 may be in the form of one or more rigid cards or be a printed pamphlet having a plurality of pages. In addition, the instructions can be in the form of a plurality of sets of cards or pamphlets with a different set for men, women or children.

FIG. 2 shows the kit in folded form. FIG. 3 shows an end view of the folded kit. When in folded form, the kit's contents are enclosed within the folder and are thereby protected from loss or from inadvertent marking. In the folded configuration, the kit requires a minimum of space and may be placed within a pocket or pocketbook where it is readily accessible.

The kit is designed to facilitate a user's recording of measurement or "size" information about another person. A user would initially meet with a person and obtain the measurement and size data listed on card 38. This information would then be readily available and accessible for use at a later date to enable the user to properly select an apparel-type gift of the appropriate size for the person described on the data card 38.

The embodiment disclosed herein has been discussed for the purpose of familiarizing the reader with the novel aspects of the invention. Although a preferred embodiment of the invention has been shown and described, many changes, modifications and substitutions may be made by one having ordinary skill in the art without necessarily departing from the spirit and scope of the invention as described in the following claims.

I claim:

1. A measurement and size determination and recording kit comprising:
   a foldable base having a front surface and a back surface;
   a measuring tape secured to said base;
   a writing utensil removably received within a retaining means secured to said base;
   a plurality of data cards removably attached to the base by a card retaining means that is secured to the front surface of said base and allows said cards to be removed from the base and then reattached to the base, each of said cards having indicia adjacent blank areas wherein said indicia specify measurement areas of a human body and also associated items to be worn on a human body and wherein said blank areas are designed to be written on by a user employing said writing utensil; and
   an instruction/information guide secured to the front surface of said base, said guide having pre-printed instructions and information that detail how to use the measuring tape to obtain apparel size based on measurements of a human body.

2. The kit of claim 1 wherein the base includes at least one crease that extends from a top edge of the base to a bottom edge of the base and wherein said at least one crease facilitates a user's ability to fold the base along the crease and to thereby reduce a width dimension of the kit.

3. The kit of claim 2 wherein the base includes at least two spaced creases and wherein each crease extends from the bottom edge of the base to the top edge of the base and thereby divides the base into three side-by-side portions with each portion being approximately equal in width to one of said data cards.

4. The kit of claim 3 wherein when the base is folded along the creases, it has dimensions of approximately eight inches long and four inches wide.

5. The kit of claim 1 wherein the measuring tape includes an outer housing and a flexible strip of material having regularly spaced markings retractable within said housing.

6. The kit of claim 1 wherein the kit further includes a ring-size determination tool removably attached to the base by a tool retaining means that is secured to the front surface of said base, said retaining means allowing said tool to be removed from said base and then reattached to the base.

7. The kit of claim 6 wherein the ring-size determination tool has a first length, the data cards have a second length and the measurement guide has a third length and wherein the first, second and third lengths are non-equal.

8. The kit of claim 1 wherein the card retaining means is in the form of a pocket that functions to removably retain the data cards and the instruction/information guide.

9. A measurement and size determination and recording kit comprising:
- a base having a front surface, a back surface, and at least two spaced creases and wherein said creases extend from a bottom edge of the base to a top edge of the base and whereby said creases divide the base into three side-by-side portions and facilitate a user's ability to fold the base along the creases to thereby reduce a width dimension of the base;
- a measuring tape secured to said base;
- a plurality of data cards removably received within a pocket that is secured to the front surface of said base, each of said cards having indicia adjacent blank areas and wherein said indicia specify measurement areas of a human body and wherein said blank areas are designed to be written on by a user employing a writing utensil; and
- an instruction/information guide removably received within a pocket that is secured to the front surface of said base, said guide having pre-printed instructions and information that detail how to obtain apparel size based on measurements of a human body.

10. The kit of claim 9 further comprising a ring-size determination tool releasably retained within said pocket of said base.

* * * * *